March 20, 1962  E. BOSSI  3,025,781
MACHINE FOR PREPARING COFFEE BEVERAGE
Filed Dec. 23, 1958  4 Sheets-Sheet 1

March 20, 1962    E. BOSSI    3,025,781
MACHINE FOR PREPARING COFFEE BEVERAGE
Filed Dec. 23, 1958    4 Sheets-Sheet 2

March 20, 1962  E. BOSSI  3,025,781
MACHINE FOR PREPARING COFFEE BEVERAGE
Filed Dec. 23, 1958  4 Sheets-Sheet 3
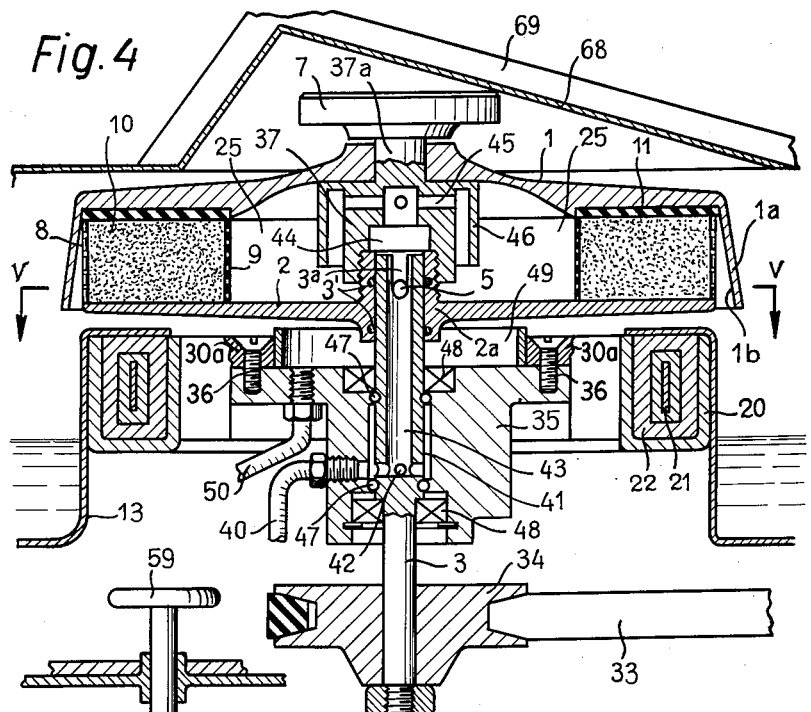
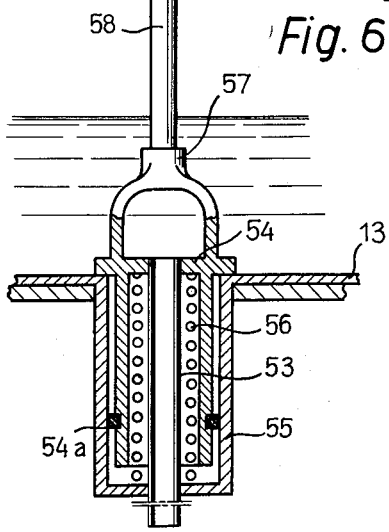
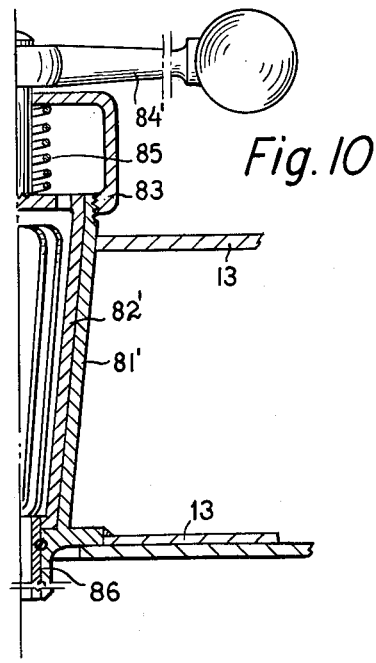

March 20, 1962 — E. BOSSI — 3,025,781
MACHINE FOR PREPARING COFFEE BEVERAGE
Filed Dec. 23, 1958 — 4 Sheets-Sheet 4

3,025,781
MACHINE FOR PREPARING COFFEE BEVERAGE
Enrico Bossi, Milan, Italy, assignor to
Piero Gennari, Milan, Italy
Filed Dec. 23, 1958, Ser. No. 782,520
Claims priority, application Italy Jan. 15, 1958
16 Claims. (Cl. 99—302)

This invention relates to a machine for preparing coffee beverage.

Machines are known for preparing coffee beverage of the so called "coffee cream" type having a surface layer of a creamy aspect which is highly appreciated by the public. These known machines are capable of preparing on each operation a relatively small quantity of beverage only and cannot be utilized where a considerable quantity of beverage should be prepared in a short period of time, so that other types of machines must be resorted to, which do not yield a beverage of superior quality. Moreover, the machines are very clumsy and elaborate and expensive in construction.

This invention provides a machine capable of rapidly supplying larger quantities of coffee beverage of the so called coffee cream type.

A further object of this invention is to provide a machine of the type referred to above, which is simple and cheap in construction, reduced in size and easy to manipulate.

The improved machine for preparing coffee beverage comprises a rotor adapted to rotate about a vertical axis provided over its circumference with a goblet for the coffee powder comprising an annular hollow body, the outer and inner side walls of which are both permeable to provide a strainer; means for supplying hot water to a central chamber in the rotor, the outer lateral wall of which is constituted by the inner wall of the said receptacle, and a stationary collector arranged externally of the rotor for collecting the beverage formed by the flow of hot water from the chamber through the coffee powder in the goblet by effect of centrifugal force generated by a quick rotation of the rotor.

Figure 1:
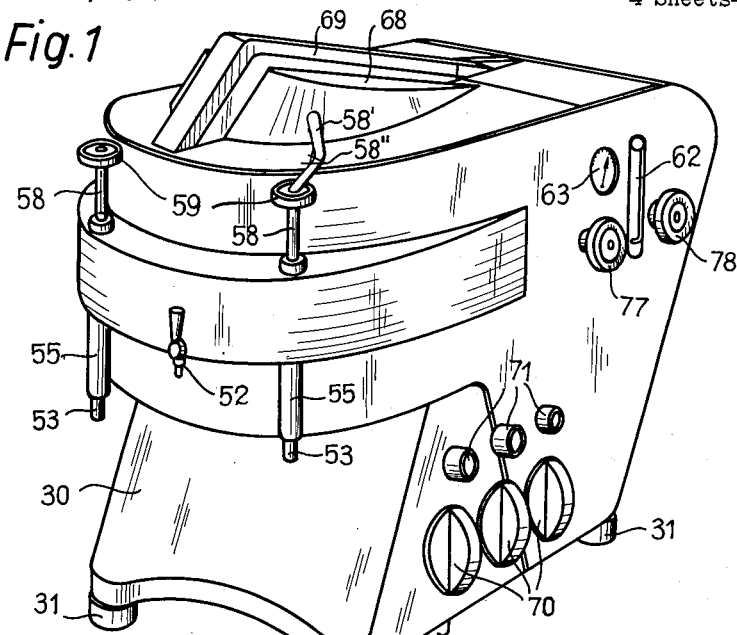
Figure 3:
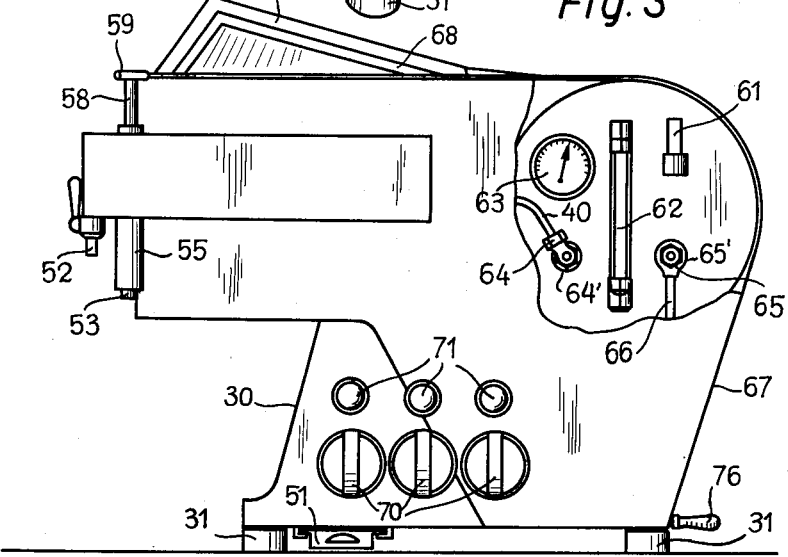
Figure 2:
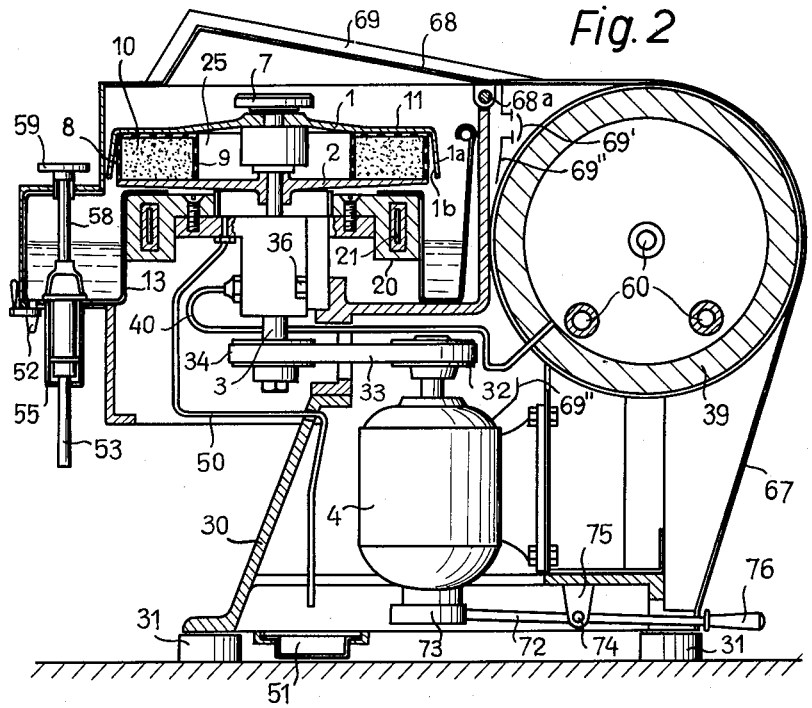
Figure 5:
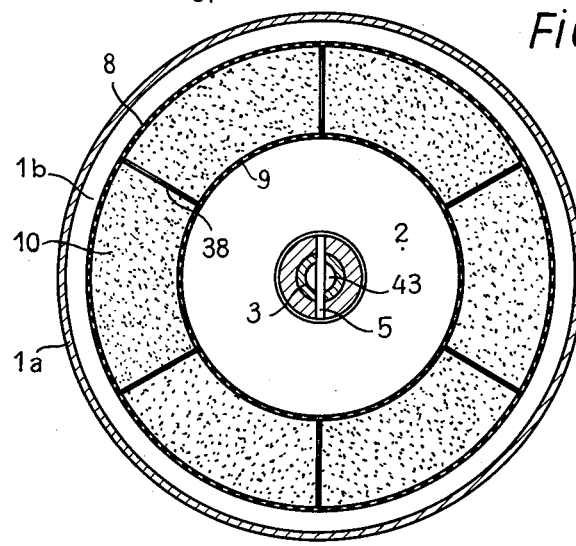
Figure 7:
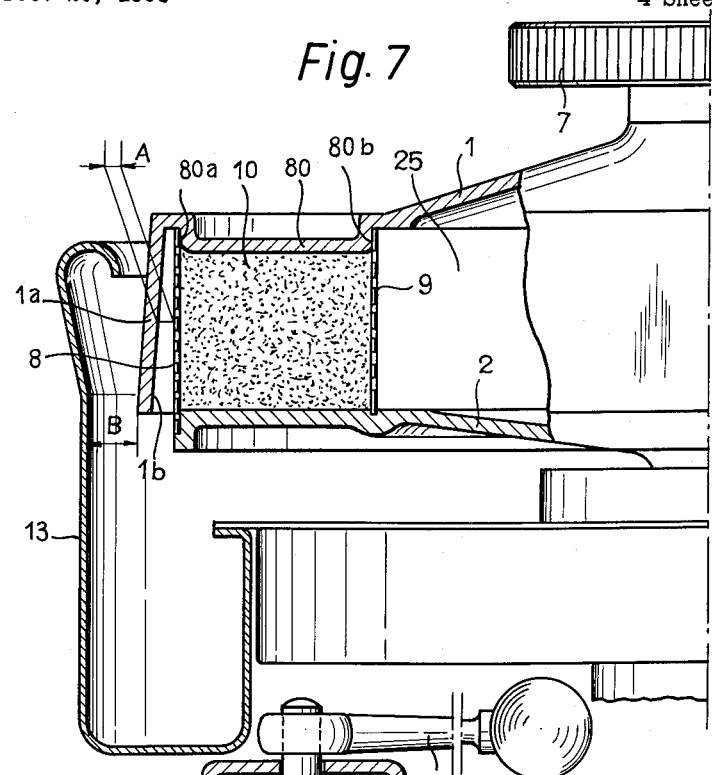
Figure 8:
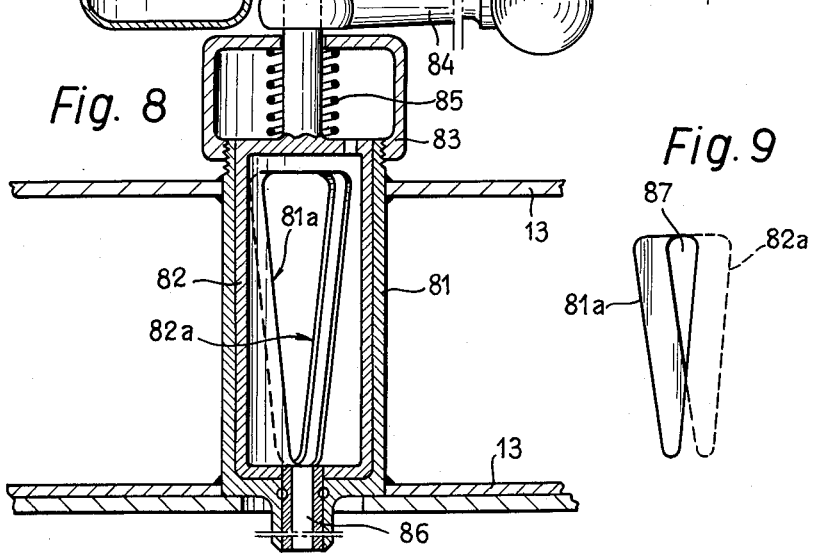
Figure 9:
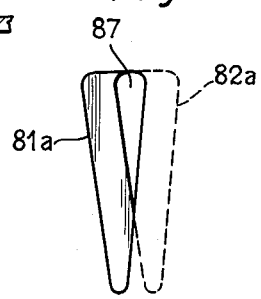

Further characteristic features and advantages of this invention will be understood from the detailed appended description referring to the accompanying drawings, given by way of a nonlimiting example, wherein:

FIG. 1 is a perspective view of a first embodiment of the machine,

FIG. 2 is a longitudinal sectional view of the machine on a vertical plane extending through the axes of the rotor and associated motor, FIG. 3 is a side view of the machine, its outer casing being removed in part, FIG. 4 is an axial sectional view of the rotor on an enlarged scale with respect to FIG. 2, FIG. 5 is a sectional view of FIG. 4 along line 5—5, FIG. 6 is a sectional detailed view of FIG. 4 on an enlarged scale, FIG. 7 is a part axial sectional view of the rotor according to a further embodiment of the machine, FIG. 8 is an axial sectional view of a further embodiment of a pick-up device shown in FIG. 6, and FIG. 9 shows on a smaller scale of the openings of the cylinders of FIG. 8 at an intermediate stage of displacement, and FIG. 10 is a half-view of a modified form of the pick-up device of FIG. 8.

The machine shown in FIGS 1 to 6 comprises a cast frame 30, supported by legs 31 of resilient material, such as rubber.

As shown in FIG. 2 an electric motor 4 arranged with a vertical axis is secured to the frame, the motor shaft extending upwardly, having keyed thereto a pulley 32 driving through a transmission belt 33, a pulley 34 connected to the rotor shaft 3.

As seen in FIG. 4, the shaft 3 is carried by a cast support 35 secured by screws 36 to the bracket 30a carried by the frame 30.

The shaft 3 carries a rotor comprising a top disc 1 serving as a detachable cover and a lower disc 2, the discs 1 and 2 being coaxial with each other and being arranged with vertical axes. The lower disc 2 is provided with a hub 2a adapted to be fitted on the rotor shaft 3. The hub 2a is mounted on the shaft 3 with a light fit in order to facilitate assembly and disassembly. Noisy operation which may result therefrom is prevented by arranging in seatings in the inner hub surface, rubber rings 3' of circular cross section, acting as resilient spacers between the hub and shaft. A cross pin or spline 5 extends through the hub 2a, across its axis, the spline 5 being received by a transverse groove 3a cut in the top end of the shaft 3.

The top disc 1 is loosely mounted on a pin 37a integral with a hot water distributor 37 screwed on the hub 2a on the disc 2; the top end of the pin 37a carries a control knob 7 by means of which the distributor 37 can be unscrewed from hub 2a and the top disc or cover plate 1 of the strainer can be removed.

Two permeable walls 8, 9 are secured between both discs and comprise cylindrical walls different in diameter, arranged coaxially to the discs. The annular space confined by the walls 8, 9 and annular portion of the disc 2 between the said walls, forms a chamber adapted to receive the finely-ground coffee having the general form of a powder denoted by 10. The two permeable walls 8, 9 may be in the form of thin foraminated metal sheets. The holes in the inner wall 9, adapted to act as a shower in order to subdivide the hot water stream, are larger in diameter than the holes in the outer wall 8 acting as a strainer.

Both walls 8, 9 are secured on their lower edge to the disc 2, the disc 1 tightly resting on the top edge of the walls through the interposition of an annular packing 11 of resilient material, such as rubber. Radial supports 38 (FIG. 5) are interposed between the walls chiefly for stiffening the structure.

The top disc 1 is provided over its circumference with a frusto-conical lip 1a extending downwardly, having its larger base at the bottom. The lip is arranged to surround the outer foraminated wall 8 acting as strainer, so that the infusion issuing therefrom impinges upon the inner surface 1b of the lip. It was experimentally ascertained that the provision of the lip 1a serving as an annular baffle for the infusion just formed, rotating together with the coffee powder chamber, yields a more abundant and persistent cream than is obtainable from conventional machines. It was, moreover, ascertained that when using a rotor with a 212 mm. diameter of the outer wall 8 best results are obtained with an average spacing of the inner surface of the lip 1a and outer surface of the cylindrical wall 8, ranging between 2 and 5 mm., preferably 3 mm. It will be observed that this spacing depends upon the diameter of the rotor and rotational speed.

The machine is suitable for the use in connection with various types of rotors having foraminated cylindrical walls 8, 9 varying in height but equal in diameter, in order to vary the size of the annular chamber receiving the coffee powder 10 in accordance with temporary service requirements. Referring to FIG. 4, for instance, disc 2 having walls 8, 9 smaller in height than shown on the drawing, can be used, the same cover plate 1 being maintained, when it is desired to reduce the quantity of beverage obtainable by one operational cycle of the machine, at a constant concentration.

Hot water is supplied to the rotor from a boiler 39 through a pipe 40 (FIG. 4) opening into an annular chamber 41 formed within the support 35, surrounding the shaft 3. The latter has radial holes 42 bored therein, connecting with an axial conduit 43 opening at the top into a recess 44 in the distributor 37. The recess 44 connects with the circular chamber confined by the wall 9 through radial conduits 45 bored in the distributor. The distributor is surrounded by a skirt 46 open downwardly to guide the water toward the bottom of the circular chamber 25.

The annular chamber 41 is closed at the top and bottom by packings 47, externally of which bearings 48 supporting the shaft are arranged.

An annular bed plate 20 of U-shaped cross section is arranged beneath the rotor and accommodates a heating resistor 21 embedded in an electrically isolating mass 22 which is however a good heat conductor. The bed plate 20 is arranged in contact with the inner wall of a channel 13 collecting the beverage in order to preheat the said wall and keep it hot during preparation of the beverage, there by preventing cooling of the latter as it is being discharged into channel 13.

A recess is formed over the support 35 for collecting any hot water oozing between the hub 2a and shaft 3 as well as any condensed water formed during operation for discharge through a tube 50 into a shallow tray 51.

The boiler 39 is equipped with heating resistors 60, a safety valve 61, a standpipe of transparent material 62 for indicating the water level in the boiler, a pressure gauge 63, a connection 64 for connecting the hot water delivery tube 40 and a connection 65 for the steam spill pipe 66, the connection 65 connecting with a tube (not shown on the drawing) arranged within the boiler opening in the neighborhood of the boiler top.

The hot water flow supplied from the boiler to the rotor is adjusted by menas of a cock 64' incorporated in the connection 64 and controlled by means of a hand wheel 77.

Similarly, discharge of steam is adjusted by means of a cock 65' incorporated in the connection 65 and controlled by means of a hand wheel 78.

The whole machine is enclosed by a sheet metal casing 67 having at the top a lid 68 for access to the rotor, provided with a handle 69 (FIG. 2) and hinged at 68a. A circuit breaker 69' with a conductor 69" is provided for breaking the electrical circuit of the motor 4 when the lid 68 is lifted for access to the rotor.

Switches 70 project from the casing and frame for controlling the electric motor 4, rotor heating resistor 21 and boiler heating resistors 60, indicating lamps 71 being lightened up when the various resistors are switched in.

Beneath the motor a beam 72 is provided which carries a brake shoe 73 for the motor and is hinged at 74 to a bracket 75 extending downwardly from the frame 30, the brake 73 being operable by means of a handle 76.

The machine operates as follows: upon closing of the cover plate 68, the rotor is set in rotation and hot water is supplied from the boiler to the central chamber 25 in a quantity adjustable by the hand-wheel 77. Water flows from chamber 25 through the shower 9 and coffee powder, issuing from the strainer 8 in the form of a beverage which impinges upon the wall 1b of the baffle lip 1a; the infusion dripping from the lower edge of the rotating baffle 1a under the action of the centrifugal force impinges upon the near lateral wall of the stationary collector 13 and collects on the bottom of the latter.

The coffee beverage in the collector 13 may be fully discharged by means of a cock 52 into an underlying container such as a flask equalling at least the content in collector 13. Owing to the stratification of the coffee beverage collected in collector 13, it is not advisable to draw apart quantities of beverage, such as a cupful by means of the bottom cock 52.

For the latter purpose the collector 13 can be provided with pick-up or sampler devices for drawing small quantities of beverage, averaging in composition the various layers. One such device is shown in a detailed sectional view in FIG. 6.

The device comprises a tube 53 open at both ends secured at the top to a bush 54 movable in a guide cylinder 55 secured to the bottom of the collector channel 13. The bush 54 carries a packing 54a sealing against the cylinder 55. A spring 56 is interposed between the bottoms of the bush 54 and guide cylinder 55. The end of the bush 54 has secured thereto a bracket 57 fast with a control rod 58 provided at its upper end with a knob 59. The axial displacement of the rod 58 can be effected by means of a rocking lever 58' hinged at 58" to the machine frame.

The pick-up device operates as follows: by depression of the knob 59 the tube 53 is slowly moved downwardly, whereby coffee infusion is discharged through the tube 53, the infusion being initially drawn from the creamy surface of the beverage in the collector 13, and subsequently drawn from the lower layers, the density of the beverage increasing gradually toward the collector bottom on which the denser portion of the infusion, which issued first from the strainer 8, is deposited.

By variation of the downward speed of the rod 58 the operator can obviously vary the density of the infusion poured into the various cups in accordance with requirements.

By slow start of the descent of the rod 58, a considerable quantity of cream is collected, while a quick descent yields a small proportion only.

The same applies to the infusion underneath the creamy layer, which may be varied in density at will by variation of the downward speed of the rod.

Two such devices are provided in the construction shown (FIG. 1); the number thereof can be varied in accordance with requirements.

In the modification shown in FIG. 7 the top disc 1 of the rotor serving as a removable cover plate, is formed with an annular extension 80 integral therewith, such as by casting. The extension 80 has two cylindrical sides 80a, 80b which are in slightly forced engagement with a not foraminated top portion of the inner face of the cylindrical strainer 8 and with the outer face of the cylindrical shower 9, whereby sealing is effected without the use of packings. In order to facilitate penetration of the extension into the chamber containing the coffee powder 10 two bevelled connection surfaces between the sides 80a, 80b and the bottom of the extension are provided. In this construction the radial members connecting the walls 8 and 9, denoted by 38 in FIGURE 5, are conveniently dispensed with, whereby the coffee powder can be more evenly distributed throughout the circumference of the annular chamber, confined laterally by the strainer and shower 8, 9, respectively, at the top by the extension 80 and at the bottom by the disc 2. This construction moreover facilitates discharging of the exhausted coffee powder as compared with the previously described construction.

In FIG. 7, A denotes the average spacing of the outer surface of the strainer 8 and inner surface 1b of the baffle 1a carried by the cover plate 1. As mentioned above the best results were ascertained when the said spacing A is of the order of 3 mm. In FIGURE 7, B denotes the spacing of the lower edge of the baffle 1a and adjacent inner surface of the annular collector 13 for the infusion. Experience has shown that when a rotor 212 mm. in diameter of the outer strainer wall 8, is used, revolving at 2300 revolutions per minute, the best results in respect of the production of cream are obtained when the said spacing ranges between 5 and 25 mm. and is preferably of 10 mm.

Obviously the spacing B also is dependent upon the diameter of the rotor and rotational speed.

FIGS. 8 and 9 show a cock for discharging the coffee infusion collected in the annular collector 13. This cock may be either utilized for discharging the whole content of the collector 13 at one time, or drawing small quantities of infusion, each being of an average composition, thereby combining in one member the functions which were performed in the previously described construction by two distinct members, namely the cock 52 and pick-up or sampler device.

The cock comprises an outer cylindrical body 81 secured to the collector 13 extending throughout the height of said collector. A cylinder 82 is rotatably mounted in the cylinder 81 and is formed with a top extension having secured thereto an operating lever 84. The top end of the cylinder 81 is provided with an outer screw thread having secured thereon a nut 83 having a wide inner cavity. A spring 85 is interposed between the top wall of the nut 83 and the top wall of the revolving cylinder 82. The spring load may be adjusted by means of the nut 83 to afford a satisfactory seal between the cylinders 81 and 82. According to a modification shown in FIG. 10, the cooperating inner walls of the members 81 and 82 may be made conical instead of cylindrical as illustrated at 81' and 82' respectively. The cylinder 81 is formed with an opening 81a in the form of an isosceles triangle having rounded angles, its apex facing downwardly. The cylinder 82 is formed with a corresponding opening 82a. The bottom of the cylinder 82 is provided with a channel 86 for discharging the infusion.

By angular motion of the cylinder 82 by means of the lever 84, in order to bring the openings 81a and 82a in register with each other, the coffee is discharged from the collector 13 throughout the height of the said collector. By gradual displacement of the cylinder 82, coffee is gradually drawn from the various layers, that is from the superficial cream layer to the dense bottom layer, the passageway denoted by 87 in FIG. 9 gradually varying in height from its closed to its wide opening position.

It will be understood that the principle of the invention being left unaltered, embodiments and constructional details of the machine may be widely varied with respect to the nonlimiting example described and shown, without departing from the scope of this invention.

Also, although reference has been made throughout the specification to the use of the machine for producing coffee infusion, it should be understood that this invention is not limited to such specific use and the machine may be utilized for producing other infusions.

What I claim is:

1. A machine for preparing a coffee infusion comprising a rotor adapted to be rotated about a vertical axis, means defining an inner chamber in said rotor, a circumferential outer chamber on said rotor disposed radially outwardly of said inner chamber adapted to receive coffee powder and comprising an annular body having a cylindrical outer wall and a concentric cylindrical inner wall, said outer wall and said inner wall being permeable to water, the inner wall of said outer chamber defining the outer periphery of said inner chamber, means for supplying hot water to said central chamber of the rotor, a trunco-conical annular wall surrounding and slightly spaced from the rotor and extending continuously substantially throughout the entire height of said outer wall of the outer chamber, and said annular wall defining a baffle adapted to be impinged upon by the coffee infusion issuing through said outer wall of the outer chamber upon rotation of said rotor and deflected downwardly, a stationary collector disposed externally of the rotor for collecting the infusion issuing from said outer wall and deflected downwardly by said annular wall, and means for confining the coffee powder in said outer chamber during flow of hot water therethrough in response to the circumferential force generated upon rotation of said rotor.

2. Machine as claimed in claim 1, wherein the average spacing of the outer wall of the outer chamber and baffle does not exceed 5 mm.

3. Machine as claimed in claim 1, wherein the rotor comprises two coaxial discs, the lower disc having secured thereto the two cylindrical permeable side walls of the outer chamber, and the top disc being in the form of a removable cover and being provided with a circumferential annular extension facing downwardly and defining said baffle adapted to be impinged upon by the infusion issuing from the outer wall of the outer chamber.

4. Machine as claimed in claim 1, wherein the two permeable side walls of the outer chamber are made of thin foraminated sheet metal, the holes in the inner wall being larger in diameter than the holes in the outer wall.

5. Machine as claimed in claim 3, further comprising an electric motor and a vertical shaft driven by said motor and wherein said rotor has an axial bore opening into said middle chamber and wherein the bottom disc of the rotor is provided with a hub connected to said vertical shaft, said hub having at the top a screw threaded portion receiving the hub of the top disc of the rotor.

6. Machine as claimed in claim 1, wherein the machine is equipped with heating means adjacent the collector for the coffee infusion, in order to keep hot the infusion collected therein.

7. Machine as claimed in claim 1, wherein said rotor is mounted on a shaft having an axial bore opening into said middle chamber and wherein the hot water for producing the infusion is adapted to be fed to the middle chamber in the rotor through said axial bore in the rotor shaft opening into said chamber, the bore being connected with a water heating boiler by a supply pipe, said bore and said supply pipe providing said means for supplying hot water to said central chamber of the rotor.

8. Machine as claimed in claim 7, wherein the hot water supply pipe is connected with the axial bore in the rotor shaft through an annular chamber formed in a shaft bearing surrounding said shaft, the annular chamber connecting with the axial bore in the shaft through radial holes in the shaft.

9. Machine as claimed in claim 1, wherein the rotor is connected to be driven by an electric motor arranged with a vertical axis, the rotor being arranged at a higher level than the moter, and there is provided a boiler for heating the water disposed adjacent the rotor, and higher in level than the the motor on the opposite side of the motor from the rotor.

10. Machine as claimed in claim 1, wherein the collector for the infusion is provided with an integral sampler means movably mounted in said collector and adapted for discharging small quantities of infusion of a composition averaging the various infusion layers in the collector.

11. Machine as claimed in claim 10, wherein the sampler means comprises a tube open at both ends movable in a cylinder fast with the bottom of the collector under the action of a hand control against resilient return means between a top position in which the top end of the tube is above the level adapted to be reached by the coffee infusion and a lower position in which the said end is in proximity to the bottom of the collector.

12. Machine as claimed in claim 1, wherein the top disc of the rotor is formed with a depending annular extension adapted to be slightly forced into the space between the top edges of the two permeable walls carried by the lower rotor disc to seal the top disc against the walls.

13. Machine as claimed in claim 12, wherein the annular extension on the top disc has two cylindrical lateral surfaces merging by bevelled connections to the bottom of the extension.

14. Machine as claimed in claim 1, wherein the spacing of the bottom edge of the baffle carried by the rotor and the adjacent wall of the stationary collector does not exceed 25 mm.

15. Machine as claimed in claim 1, wherein the collector for the infusion is provided with sampler means adapted for discharging small quantities of infusion of a composition averaging the various infusion layers in the collector and wherein the sampler means comprises a cock having a plug rotatable about a vertical axis within a sleeve arranged in the collector extending throughout the height of the collector, the plug and sleeve having formed therein registering openings extending approximately throughout the height of the collector and so shaped that on rotation of the plug from its closing position to its wide open position, the passageway for the infusion from the collector to the inside of the plug being gradually increased in width and gradually extended in height in a downward direction, the inner chamber in the plug connecting with a discharge conduit for the infusion from the collector.

16. Machine as claimed in claim 1, wherein the collector for the infusion is provided with sampler means adapted for discharging small quantities of infusion of a composition averaging the various infusion layers in the collector and wherein the sampler means comprises a cock having a plug rotatable about a vertical axis within a sleeve arranged in the collector extending through the height of the collector, the plug and sleeve having formed therein registering openings extending approximately throughout the height of the collector and so shaped that on rotation of the plug from its closing position to its wide open position, the passageway for the infusion from the collector to the inside of the plug is gradually increased in width and gradually extended in height in a downward direction, the inner chamber in the plug connecting with a discharge conduit for the infusion from the collector, the said openings in the sleeve and plug being in the form of isosceles triangles having rounded off angles and their apex facing downwardly.

References Cited in the file of this patent

UNITED STATES PATENTS

| | | |
|---|---|---|
| 202,135 | Babbitt | Apr. 9, 1878 |
| 1,033,884 | Freymuth | July 30, 1912 |
| 1,471,752 | Rieckmann | Oct. 23, 1923 |
| 1,602,632 | Zorn | Oct. 12, 1926 |
| 2,107,923 | Adams | Feb. 8, 1938 |
| 2,254,565 | Chappelle | Sept. 2, 1941 |
| 2,866,400 | Cornelison | Dec. 30, 1958 |

FOREIGN PATENTS

| | | |
|---|---|---|
| 208,788 | Great Britain | Dec. 27, 1923 |